United States Patent Office 3,699,043
Patented Oct. 17, 1972

3,699,043
NITROGEN-CONTAINING p - TERT-BUTYL-STYRENE COPOLYMERS IN LUBRICANT COMPOSITIONS
Robert Bacskai, Kensington, Calif., assignor to Chevron Research Company, San Francisco, Calif.
No Drawing. Filed Dec. 18, 1969, Ser. No. 886,383
Int. Cl. C10m 1/28, 1/32
U.S. Cl. 252—50   4 Claims

ABSTRACT OF THE DISCLOSURE

High molecular weight nitrogen-containing copolymers of p-tert-butylstyrene and lubricating oil containing them.

BACKGROUND OF THE INVENTION

This invention relates to novel high molecular weight nitrogen-containing copolymers of p-tert-butylstyrene and lubricating oils containing them as viscosity index improving dispersants.

Oil-soluble high molecular weight polymers are useful in a variety of applications. They are widely used as thickeners in compositions such as paint and the like. They are also used as thickeners for fuel compositions or as viscosity index improvers in lubricating oil compositions. Oil-soluble high molecular weight polymers containing polar groups find utility as dispersants for paints, fuels, lubricants and other compositions.

SUMMARY OF THE INVENTION

It has now been found that copolymers of p-tert-butylstyrene and nitrogen-containing monomer selected from the group consisting of 4-vinylpyridine and N-vinylpyrrolidone, said copolymer having an average molecular weight as determined by standard light-scattering measurements in the range of from about 20,000 to about 1,000,000 and a solubility in mineral lubricating oil of at least about 0.1% by weight, are effective as thickening and dispersing agents, more specifically as viscosity index improvers and dispersants in oils of lubricating viscosity.

DESCRIPTION OF THE PREFERRED EMBODIMENTS

The copolymers of p-tert-butylstyrene and 4-vinylpyridine or N-vinylpyrrolidone are prepared by any one of the well known mass, suspension, solution or emulsion copolymerization processes. The preferred method of preparation is via the emulsion polymerization process. In all of these processes the monomers are mixed in the desired ratio, a free radical initiator is added, and the entire mixture is heated to effect copolymerization.

In mass or bulk copolymerizations the process is carried out in the absence of any diluent. In the solution polymerization process the monomers and catalyst are dissolved in a solvent of the aliphatic or aromatic hydrocarbon type such as benzene or of the chlorinated hydrocarbon type such as ethylene chloride. In the suspension and emulsion processes the monomer mixture is dispersed in an aqueous medium sometimes with the aid of a surfactant. In general, the accepted procedures of the prior art for the preparation of styrene copolymers are satisfactory.

The copolymers of p-tert-butylstyrene of the invention have average molecular weights of at least about 20,000 as determined by standard light-scattering methods. For present purposes the preferred copolymers have average molecular weights in the range of from about 50,000 to about 1,000,000 and a solubility in mineral lubricating oil of at least about 0.1% by weight.

The nitrogen-containing monomers in the p-tert-butylstyrene copolymers according to the invention are present in minor proportions sufficient to impart polarity and dispersing characteristics to the copolymers in hydrocarbon media. For present purposes effective dispersing characteristics are obtained with proportions of at least about 0.1% by weight and preferably at least about 1.0% by weight. The quantity of nitrogen-containing monomer in the copolymers of this invention ordinarily does not exceed about 10% by weight since at this point the copolymer becomes insoluble in hydrocarbon lubricating oils. Preferably the nitrogen-containing monomer does not amount to more than about 5% by weight of the copolymer.

The following examples are further illustrative of the nitrogen-containing copolymers of p-tert-butylstyrene according to this invention. Unless otherwise specified, the proportions in the illustrative examples are on a weight basis.

(I) Bulk copolymers

The copolymerization of p-tert-butylstyrene with 4-vinylpyridine (4-VP) was conducted in bulk using various proportions of reactants. The reactions were carried out with free radical catalyst in vacuum in degassed, sealed Pyrex tubes. The catalyst used was 0.05 g. azoisobutyronitrile and the reaction was at 70° C. for 16.5 hours. Following polymerization the Pyrex tubes were opened and the solid products dissolved in hexane, then precipitated into methanol. The polymer precipitate was filtered, washed with methanol and dried at 70° C. in vacuum. These examples are summarized in the following table:

TABLE I

| | Monomers | | | Polymer | | | |
|---|---|---|---|---|---|---|---|
| Ex. No. | Butylstyrene, grams | 4-VP Grams | 4-VP Weight percent | Yield, grams | N, percent | 4-VP, weight percent | Specific viscosity, η sp./C. |
| 0 | 4.55 | | | 4.06 | | | 1.05 |
| 1 | 4.45 | 0.07 | 1.55 | 3.99 | 0.27 | 2.06 | 1.05 |
| 2 | 4.46 | 0.10 | 2.19 | 4.01 | 0.37 | 2.78 | 1.23 |
| 3 | 4.54 | 0.31 | 6.39 | 3.73 | 0.91 | 6.83 | 1.14 |
| 4 | 4.54 | 0.52 | 10.3 | 4.39 | 1.38 | 10.4 | 1.22 |

Example 0 as noted above is provided for comparison and illustrates a typical p-tert-butylstyrene homopolymer prepared from monomer consisting of 95% pure p-tert-butylstyrene and 5% m-tert-butylstyrene. The specific viscosities are determined at 25° C. in benzene at concentrations of 0.1 g. per 100 ml.

(II) Solution copolymers

The copolymerization of p-tert-butylstyrene with either 4-vinylpyridine or N-vinylpyrrolidone was conducted in solution. In these examples the copolymerization was carried out in a 3-necked stirred flask under nitrogen. The solvent was either 130 Neutral oil, a California paraffin-base oil having a viscosity of 130 SSU at 100° F., or hydrocarbon, as noted in the following table summarizing these examples. In the case of the Neutral oil solvent, unreacted monomer was removed by vacuum distillation and the reaction product was diluted with additional oil to give 2.8 weight percent polymer for further testing. In the case of the hydrocarbon solvents, the copolymer was isolated by pouring the reaction mixture into methanol and filtering and drying the product.

not more than about 10.0% by weight, as an upper limit.

In the lubricating oil compositions of this invention the p-tert-butylstyrene copolymer thickeners and dispersants are used with lubricating oil base in an amount sufficient

TABLE II

| | | Polymerization conditions | | | | | | Polymer | | | |
|---|---|---|---|---|---|---|---|---|---|---|---|
| Ex. No. | Butyl-styrene, grams | "N" monomer | | Solvent, grams | Catalyst, grams | Time, hours | Temperature, °C. | Yield, grams | N, percent | 4-VP, weight percent | $\eta$ sp./C. |
| | | Grams | Weight percent | | | | | | | | |
| | | 4-VP | | | | | | | | | |
| 5 | 32.94 | 1.25 N-VP | 3.64 | 130 Neutral, 74.05 | AIBN, 0.1752 | 4.5,1 | 70–73,120 | | | | |
| 6 | 33.0 | 1.27 4-VP | 3.71 | 130 Neutral, 74.20 | AIBN, 0.1758 | 4.5,1 | 70–73,120 | | | | |
| 7 | 33.02 | 1.25 4-VP | 3.65 | Benzene, 73.86 | AIBN, 0.34 | 3.5,0.7 | 70–91 | 22.94 | 1.0 | 7.5 | 0.18 |
| 8 | 16.55 | 0.63 4-VP | .67 | Benzene, 39.07 | IPP, 0.17 | 19.7 | 50 | 11.62 | 0.675 | 5.06 | 0.14 |
| 9 | 33.10 | 1.25 | 3.64 | n-Heptane, 73.84 | AIBN, 0.34 | 2.8,1.5 | 70–105 | 19.68 | 0.84 | 6.22 | 0.19 |

In the above Table II the N monomer is either 4-vinylpyridine or N-vinylpyrrolidone, as denoted by the abbreviations 4-VP and N-VP, respectively. The free radical catalyst is azoisobutyronitrile (AIBN) or isopropyl percarbonate (IPP), as indicated.

(III) Emulsion copolymers

The emulsion copolymerization of p-tert-butylstyrene with 4 - vinylpyridine or N-vinylpyrrolidone was carried out under conditions similar to those reported previously for the polymerization of styrene by Sorenson and Campbell, "Preparative Methods of Polymer Chemistry," Interscience, 1961, page 162. The reaction was conducted under nitrogen in a 3-necked stirred flask using free radical initiator. After polymerization the emulsion was poured into acetone, filtered and washed, and filtered repeatedly with distilled water. The copolymer residue was dried in vacuum at 70° C. The amount of recovered polymer was approximately theoretical value. The molecular weight of the copolymer was varied by adjusting the amount of the chain transfer agent (tert-dodecylmercaptan) as shown by the variation in the specific viscosity.

In each of the experiments 15 g. of p-tert-butylstyrene as described above and 0.4 g. of the N monomer were reacted in 50 g. of distilled water along with 0.025 g. $Na_2HPO_4$, 0.05 g. $K_2S_2O_8$ and 0.5 g. of the sodium lauryl sulfate. The reaction was conducted at 70° C. for about two hours and then at 95° C. for about two hours.

Table III provides a summary of these examples.

TABLE III

| | Monomer feed | | Polymer | | |
|---|---|---|---|---|---|
| Ex. No. | "N" monomer, weight percent | t-Dodecylmercaptan, gram | N, percent | "N" monomer, weight percent | $\eta$ sp./C. |
| 10 | | | | | 1.06 |
| 11 | | 0.0645 | | | 0.64 |
| 12 | | 0.1075 | | | 0.48 |
| | 4-VP | | | | |
| 13 | 2.60 | 0.0645 | 0.335 | 2.51 | 1.22 |
| 14 | 2.60 | 0.1075 | 0.335 | 2.51 | 0.84 |
| 15 | 2.59 | 0.1290 | 0.325 | 2.44 | 0.47 |
| | N-VP | | | | |
| 16 | 2.61 | 0.0645 | 0.305 | 2.42 | 0.58 |
| 17 | 2.59 | 0.1075 | 0.22 | 1.74 | 0.36 |
| 18 | 2.61 | 0.1290 | 0.21 | 1.75 | 0.29 |

As shown by the above data, i.e., the specific viscosity, the addition of tert-dodecylmercaptan reduces the molecular weight.

The copolymers of p-tert-butylstyrene and nitrogen-containing monomer are oil soluble. This is intended to mean that they are soluble in conventional mineral oils and other oil compositions in a concentration of at least about 0.1% by weight based on the total composition, usually to raise the viscosity index and/or improve the detergent properties of the base lubricating oil. Ordinarily amounts of the copolymers of from about 0.1% to about 10% by weight, preferably from about 1.0% to about 5.0% by weight, are satisfactory for this purpose. In view of the excellent solubility characteristics of the copolymers, a further feature of the invention lies in the preparation of lubricating oil concentrates containing percentages of polymers of up to about 10% by weight.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di-(2-ethylhexyl)-sebacate, tricresyl-phosphate and silicate esters, such as tetra-(2-ethylhexyl)-orthosilicate and hexa-(2-ethylbutoxy)-disiloxane. For present purposes the mineral lubricating oils are preferred, since they show the greatest viscosity, detergency and stability improvement.

Lubricant compositions within the scope of the present invention may also contain still other additives of conventional types, such as pour point depressants, oiliness and extreme pressure agents, anti-oxidants, blooming agents and the like. Other types of detergents, such as metal salts, may also be employed where ash formation is not a problem.

Illustrative lubricant compositions of the aforementioned types containing additives other than the polymeric additive may include, for example, from about 0.1 to about 10% by weight of alkaline earth metal, higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and $P_2S_5$, the reaction product of polybutene and $P_2S_5$, and the bivalent metal dihydrocarbon dithiophosphates, zinc butyl amyl dithiophosphate and zinc di-(tetradecylphenyl) dithiophosphate. Metal salt detergents in amounts from about 0.1 to 10% which may also be used are the calcium petroleum sulfonates of the oil soluble mahogany type and the calcium naphthenates.

The outstanding characteristics of the lubricating oil composition containing the copolymers in accordance with this invention are shown in various tests. In these tests the viscosities of the compositions were determined and the viscosity index calculated by the Standard ASTM Method D567–41. The detergent or dispersant properties of the copolymers were determined by measuring the ability of the lubricating oil composition containing the polymer to disperse a synthetic resin in standard hydrocarbon solvent, the synthetic resin being a simulation of the resins naturally occurring in internal combustion engines. Compositions effective as dispersants were rated + while those not effective were rated —.

In the tests, 2.8% by weight of the polymer was dissolved in 130 Neutral oil, which is a California paraffin base oil having a viscosity of 130 SSU at 100° F. This base oil ordinarily has a viscosity index of 89 and a dispersant rating of —.

The tests of the copolymers of p-tert-butylstyrene in lubricating oil compositions are summarized in the following table:

TABLE IV

| Ex. No. | Viscosity 100° F. SUS | Viscosity 210° F. SUS | Viscosity index | Dispersion test |
|---|---|---|---|---|
| 0 | 423.7 | 77.58 | 142 | — |
| 1 | 438.3 | 79.70 | 142 | + |
| 2 | 469.0 | 84.10 | 142 | + |
| 3 | 449.3 | 83.13 | | + |
| 11 | 306.2 | 62.23 | 139 | — |
| 14 | 363.8 | 70.30 | 142 | + |
| 15 | 248.6 | 55.05 | 135 | + |
| 16 | 289.1 | 59.42 | 137 | + |
| A | | | 62 | 135 — |
| B | | | 72 | 138 |

In the above Table IV, Examples A and B are p-tert-butylstyrene homopolymers commercially accepted as viscosity index improvers for mineral lubricating oils and are included for the purpose of comparison with the copolymers according to the present invention.

The test results show that the copolymers of p-tert-butylstyrene and nitrogen-containing monomer in accordance with the present invention possess surprisingly good viscosity index improving properties and are effective as dispersants in hydrocarbons as illustrated by the detergent lubricating oil compositions.

In the foregoing examples of copolymer of p-tert-butylstyrene and nitrogen-containing monomers other vinyl pyridines may be used along with or instead of the 4-vinylpyridine. Such alternative vinyl pyridines include the different position isomers and alkyl substituents thereof such as 2-vinylpyridine, 3-vinylpyridine, 2-vinyl-6-methylpyridine, 4-vinyl-6-ethylpyridine, 2-vinyl-4-isopropylpyridine, 4-isopropenylpyridine, and the like. For present purposes the preferred vinylpyridine is 4-vinylpyridine of the examples in view of the effectiveness of the copolymers prepared therefrom.

As will be evident to those skilled in the art, various modifications on this invention can be made or followed, in the light of the foregoing disclosure and discussion, without departing from the spirit or scope of the disclosure or from the scope of the following claims.

I claim:

1. A lubricating oil composition comprising a major proportion of mineral lubricating oil and a minor proportion sufficient to raise the viscosity index thereof of the random copolymer consisting essentialy of p-tert-butylstyrene and from about 0.1% to about 5% by weight of vinylpyridine, said copolymer having an average molecular weight as determined by standard light-scattering measurements in the range of from about 20,000 to about 1,000,000 and a solubility in mineral lubricating oil of at least about 0.1% by weight.

2. A lubricating oil composition comprising a major proportion of mineral lubricating oil and from about 0.1 to about 5% by weight of the copolymer of claim 1.

3. A lubricating oil concentrate comprising mineral lubricating oil and from about 5 to about 10% by weight of the copolymer of claim 1.

4. A lubricating oil composition comprising a major proportion of mineral lubricating oil and from about 0.1 to 5% by weight of the copolymer of claim 1 in which the vinylpyridine is 4-vinylpyridine.

References Cited

UNITED STATES PATENTS 2,901,458 8/1959 Banes et al. _____ 252—50 X
3,417,054 12/1968 Merijan _____ 252—50 X

FOREIGN PATENTS 750,905 1/1967 Canada _____ 252—51.5 R

DANIEL E. WYMAN, Primary Examiner
W. J. SHINE, Assistant Examiner

U.S. Cl. X.R.
252—51.5 R